April 22, 1952 R. S. HARNSBERGER 2,593,674
KITCHEN UTENSIL
Filed March 17, 1949

Inventor.
Robert S. Harnsberger
By Lucke + Lucke
Agents.

Patented Apr. 22, 1952

2,593,674

UNITED STATES PATENT OFFICE 2,593,674

KITCHEN UTENSIL

Robert S. Harnsberger, Staunton, Va.

Application March 17, 1949, Serial No. 81,890

1 Claim. (Cl. 30—142)

My invention relates to a kitchen utensil, and more particularly a kitchen utensil which may be held in the hand and employed for a variety of purposes. The invention is especially useful in its application to a utensil for stirring the contents of pots, bowls or the like, and for scraping the interiors of such vessels, to which use, however, it is not restricted.

In preparing a meal, it is generally necessary for a cook to use a variety of utensils, as spoons, knives, turners and the like for mixing, stirring, scraping, tasting, basting, cutting, transferring and otherwise manipulating the food. Such operations require repeated selection, location and lifting of, and adjustment to a variety of utensils having different weights, balances, purposes and modes of operation. Considerable energy is thus expended. Furthermore, the several utensils must be separately washed, dried and returned to a variety of storage positions.

I have now found that a single utensil, of special construction, may be used for substantially all of the operations which a cook performs in preparing a meal. Thus, it becomes unnecessary to perform the extended variety of operations referred to above; preparation of the meal is simplified; and energy—nervous and physical—is conserved.

According to the invention, a kitchen utensil is provided comprising a blade of resilient material having one edge curved to conform to the bottom curve of a pot, bowl or the like, the resiliency of the material and the angle at which the blade is held permitting adjustment of the utensil to a variety of such curves. The blade is sufficiently broad to support solids such as cakes, fried eggs, hash and other cohesive solids, beneath which the blade may be pushed in the cooking container. Furthermore, the blade may be sharpened on one edge to act as a knife for cutting vegetables, melons, butter and other soft or semi-soft solids. Finally, the blade may be longitudinally and transversely curved near its outer end—or it may there be given a concavo-convex formation—whereby small quantities of liquid may be scooped up for basting a roast or tasting by the cook.

One form of the invention is shown by way of illustration in the accompanying drawings, in which.

Figure 3:
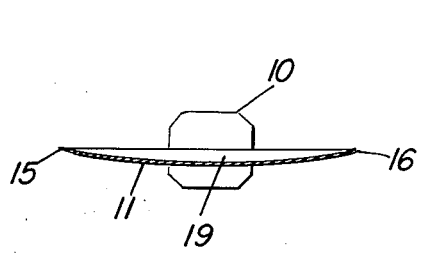
Fig. 3 is a transverse section taken on the line III—III of Fig. 1.

The form of kitchen utensil illustrated in the drawings comprises a handle 10, and a blade 11 fixed to the handle beyond which it extends in generally coaxial direction. The handle 10 is cleft inwardly from its forward end, as at 12, to receive an integral tongue 13 of the blade 11 which is there fastened by pins or rivets 14 extending through the handle and the tongue 13.

The handle 10 may be of wood, plastic, or other known or desirable material, and serves as a grip by which the blade may be held and manipulated. As here shown, the handle is tapered toward the blade for balance and to provide an easy grip. Although it is preferred to employ a separate handle fixed to the blade and of a material different from that of the blade, it will be obvious that other types of handle might be provided.

The blade 11 comprises a sheet of resilient material of substantially uniform gauge. The material of which the blade is formed is preferably steel, although it is possible to employ other suitable resilient sheet material. The blade is formed with substantially parallel longitudinal edges 15 and 16.

In the embodiment here shown, the longitudinal edge 15 of the blade is curved at its outer end as at 17, to meet the end 18 of the blade substantially tangentially. It is thus possible to stir the contents of a pot, bowl or the like with the end 18 of the blade closely adjacent the bottom thereof and the curved portion closely following its inner contour. The curved section 17 of the edge 15 also makes it possible to scrape the interior of the pot, bowl or the like with the straight portion of the edge in contact with the inner wall of the pot, bowl or the like, the end 18 of the blade in contact with the bottom of the bowl, and the curved section following the curved interior thereof between the bottom and the wall. By taking advantage of the resiliency of the blade, and by suitably turning it, different curves within a pot or bowl may be effectively scraped. To facilitate this action, the material of the blade may be made thinner as it approaches its outer end 18.

It is additionally to be noted that the generally flat formation of the present utensil makes it possible to scrape therefrom any food which adheres to it after the bowl or the like has been scraped. Such adhering food may be removed from the utensil by drawing it over the edge of the bowl or, in fact, any flat surface. It is unnecessary to remove such food from the utensil by means of a finger or a second utensil, as is the case where a spoon is used for scraping.

The longitudinal edge 16 of the blade 11 is sharpened. Accordingly, the kitchen utensil may be employed as a knife for cutting soft or semi-soft foods. It is thus possible to cut vegetables, melons, fruit, butter, and even chicken joints with the utensil; and a knife need not be substituted for the utensil except where more difficult cutting is required.

The large flat surface of the utensil, together with its thin resilient form, makes it possible to use it as a lifter and turner for food being cooked. Eggs or other foods may be turned in a pan or lifted therefrom. The utensil is an excellent spatula.

Figure 1:
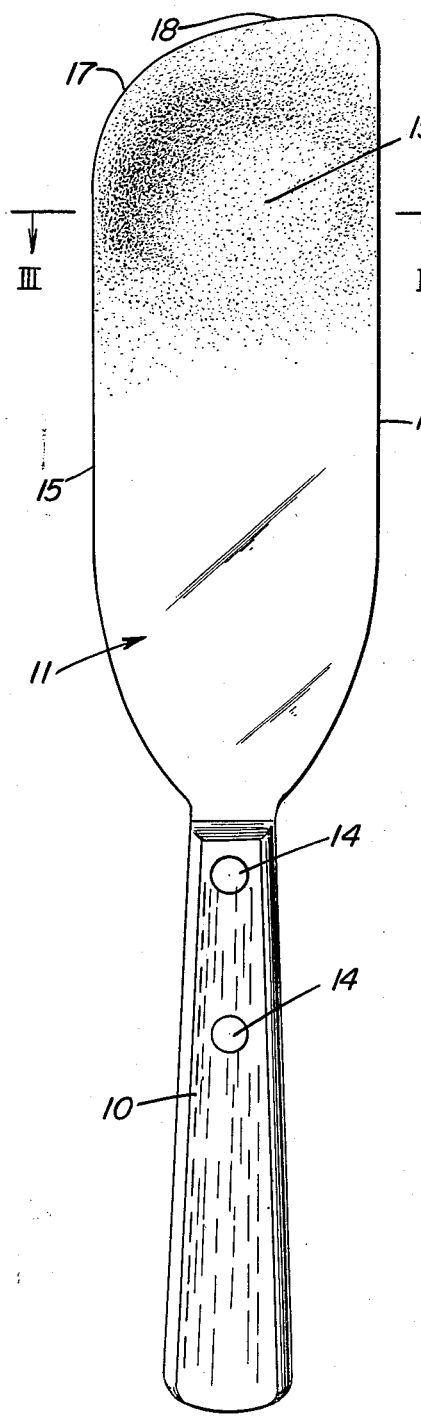
Fig. 1 is an elevation of a kitchen utensil constructed according to the invention.
Figure 2:
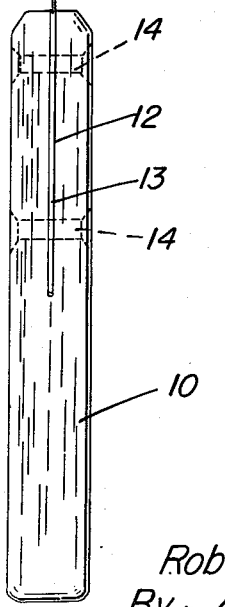
Fig. 2 is an elevation of the same utensil as viewed from the right in Fig. 1.

In the embodiment illustrated, the blade is longitudinally and transversely curved near its outer end to provide a concavo-convex formation 19 therein. See Fig. 1 and the exaggerated formation shown in Fig. 3. It is thus possible to employ the utensil to scoop up from a pan small quantities of liquid. The utensil is thus admirably adapted for basting a roast or picking up liquid grease from the bottom of a frying pan for deposit upon the upper surface of eggs or other food being cooked therein.

The blade 11 is preferably formed so that its unsharpened edge 15 is on the left thereof when viewed in the direction of the concave side of its concavo-convex formation. See Fig. 1. Thus, with the kitchen utensil held in the right hand, it is possible to scoop up and taste liquid or other food without danger of being cut by the sharpened edge 16.

From the foregoing description, it will be apparent that the invention provides a kitchen utensil which may be employed in place of a number of utensils which present kitchen practice requires to be used in sequence and repetitively. It is no longer necessary, therefore, repeatedly to select, locate and lift a variety of utensils in preparing a meal. The present invention makes it unnecessary to make personal adjustment to a variety of utensils having different weights, balances, purposes and modes of operation. The energy thus expended is avoided, as is that required subsequently to wash, dry and return the usual variety of such utensils to storage positions.

The form of the invention here particularly described and illustrated is presented merely to indicate how the invention may be applied. Other forms and embodiments of the invention are, of course, within the contemplation of the appended claim.

I claim:

A kitchen utensil, comprising a handle portion and a resilient, flexible blade made fast near one end, by a shank, to said handle portion, said blade having a width substantial relative to its length and having a free, outermost, generally tranverse end, said blade being comprised of a sheet of resilient and flexible material having substantially parallel longitudinal edges, one of which latter is sharpened and comprises a cutting edge, and the other of which is unsharpened and is curved at its end remote from the handle portion in such manner as to merge with and into the said transverse end of said blade substantially tangentially and in a smooth, continuous and uninterrupted compound curve of substantial radii of curvature, the blade being thinned in a direction away from the handle towards its outer, transverse end to impart flexibility in all directions, whereby the combination of the thinned edge and the sweeping, continuous and uninterrupted compound curve of substantial radii of curvature aforesaid enables the blade to be conformed closely to the curves of kitchen receptacles and the like of wide range of curvature, said blade being longitudinally and transversely curved near its outer end to provide a concavo-convex formation therein, thereby serving to scoop up small quantities of liquid while retaining flexibility, the unsharpened, longitudinal edge of said blade which terminates at its outer end in said continuous curve, being so related to said concavo-convex formation, that when the blade is viewed with the concave side of said formation disposed uppermost, the said unsharpened edge will lie to the left of the longitudinal axis of the blade.

ROBERT S. HARNSBERGER.

REFERENCES CITED

The following references are of record in the file of this patent:

UNITED STATES PATENTS

| Number | Name | Date |
| --- | --- | --- |
| D. 57,845 | Lickert | May 10, 1921 |
| 174,241 | Higgins | Feb. 29, 1876 |
| 1,721,130 | Myers | July 16, 1929 |
| 2,046,334 | Loeber | July 7, 1936 |
| 2,234,242 | Gilbert | Mar. 11, 1941 |
| 2,294,096 | Rice | Aug. 25, 1942 |